Jan. 12, 1971     J. R. YOUNKIN     3,555,391

OPEN LOOP SINGLE AXES SERVO FLIGHT CONTROL SYSTEM

Filed March 11, 1966     4 Sheets-Sheet 1

United States Patent Office 3,555,391
Patented Jan. 12, 1971

3,555,391
OPEN LOOP SINGLE AXES SERVO FLIGHT CONTROL SYSTEM
James R. Younkin, Mineral Wells, Tex., assignor, by mesne assignments, to Thurman & Younkin, Inc., a corporation of Texas
Filed Mar. 11, 1966, Ser. No. 533,708
Int. Cl. B64c 13/16; G05d 1/00
U.S. Cl. 318—580          14 Claims

ABSTRACT OF THE DISCLOSURE

This disclosure is directed to a flight control system for an aircraft. A control sensor is responsive to movement of the aircraft about a preselected axis to produce a control signal. An amplifier channel includes a saturable amplifier unit which operates on the control signal and drives a servo motor unit. The servo motor unit actuates a control surface of the aircraft to cause movement of the aircraft about the preselected axis. The amplifier channel has a delaying feedback loop for adding a delayed representation of the amplifier channel output signal to the control signal to vary the transfer characteristic of the amplifier channel in order to produce a servo driving signal which matches the speed-versus-input characteristics of the servo motor unit. Displacement of the control surface is thus proportional to the control signal to eliminate the requirement of a follow-up element.

---

This invention relates to a flight control system and more particularly, to a control system for an aircraft in which control surface follow-up is simulated by a unique match between a controlled element and an input signal through a saturable controlled amplifier.

In prior art autopilots, such as described by Lewis et al. in U.S. Pat. 2,853,671, and Moseley in U.S. Pat. 2,126,910, an aircraft control surface is driven by a motor in response to an attitude signal or a command signal. The motor drives a control surface and a follow-up element which serves to rebalance the system. Such systems generally have been characterized by the use of a follow-up element which is driven along with the control element. Without such follow-up, aircraft has been found to be unstable, particularly in aileron or roll control systems. In such systems, the aircraft oscillates, banking back and forth through angle dependent upon the particular system and aircraft. The purpose of the follow-up has been to provid damping of such oscillations. This has been accomplished by making the control surface deflection proportional to the system error signal, where the system error signal represents the difference between a control or command signal and an attitude signal. A signal proportional to the control surface deflection is fed to a summation point so as to produce control surface deflection directly proportional to the system error signal.

In accordance with the present invention, the same desirable results are accomplished without the use of any follow-up element. More particularly, the present flight control system employs an open loop drive for the control surface. An open loop is provided in which the controlled element is made to follow an input signal without any direct comparison between control element movements and the input signal. This is accomplished by employing a control amplifier which matches the characteristics of the controlled element to the input signal. Matching is built into the control amplifier system. In a more specific aspect, the invention involves the use of the saturable amplifier with a negative feedback signal which is acted upon by a long time constant feedback network in order to simulate short term dynamics of an integrator network. A servo driving signal is generated which matches the servo speed versus input characteristics to produce servo travel proportional to the error signal.

In a further aspect of the invention, a synchronous filter is employed in the channel leading to the servo to eliminate unwanted signal components from the servo drive channel and to provide for selective mixing of control signals.

Figure 1:
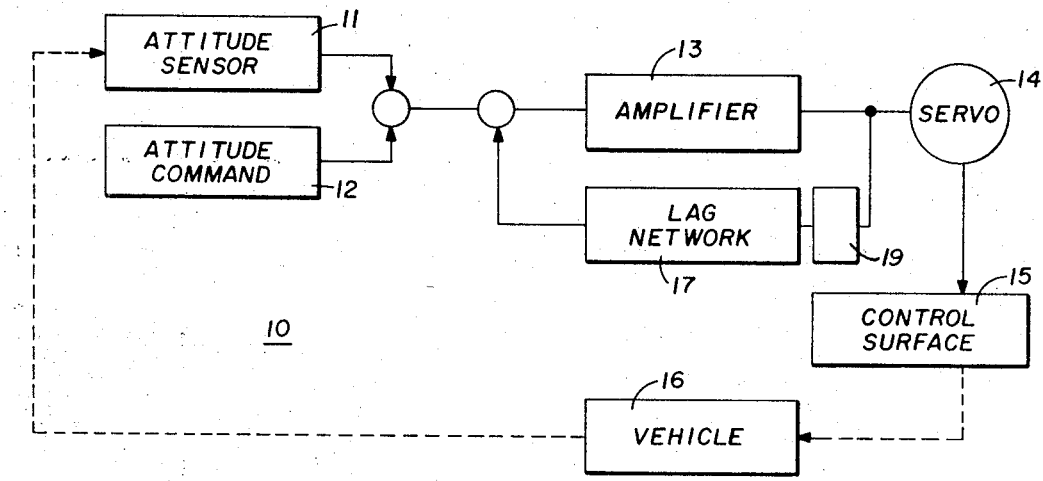
Figure 2:
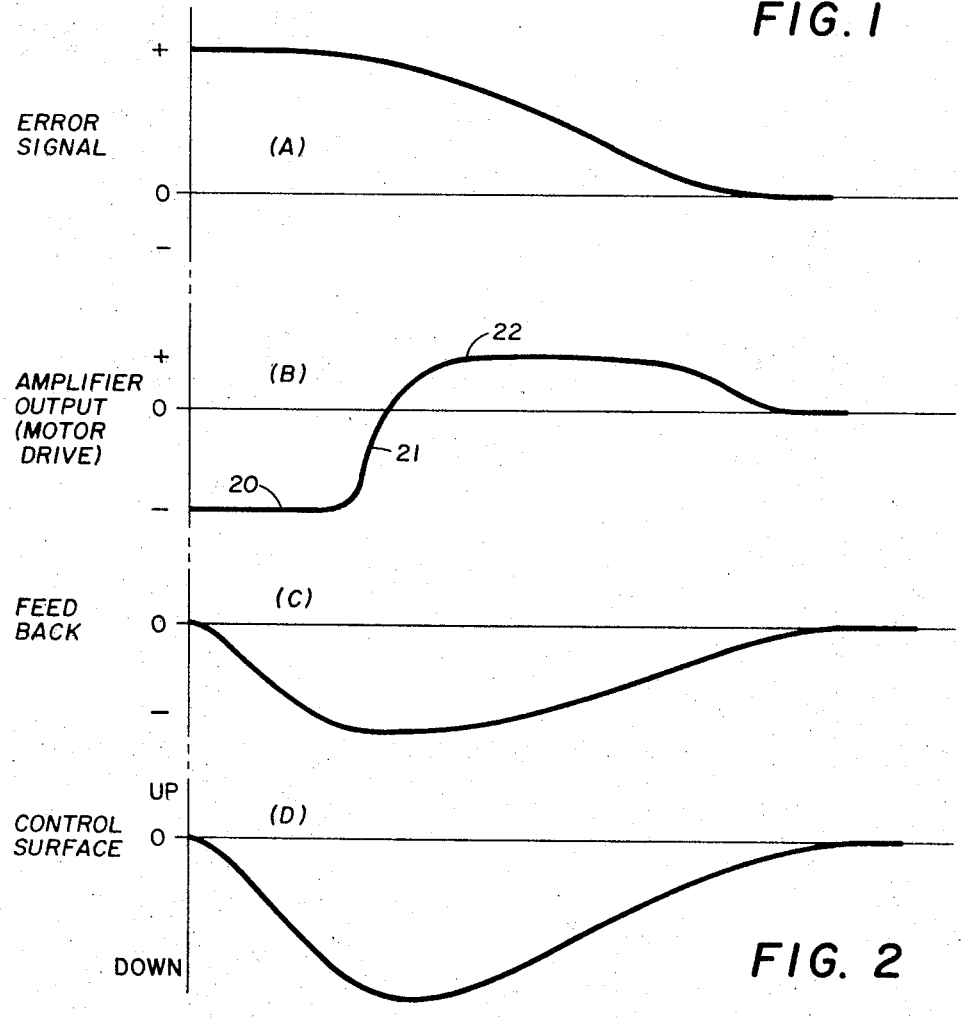
Figure 3:
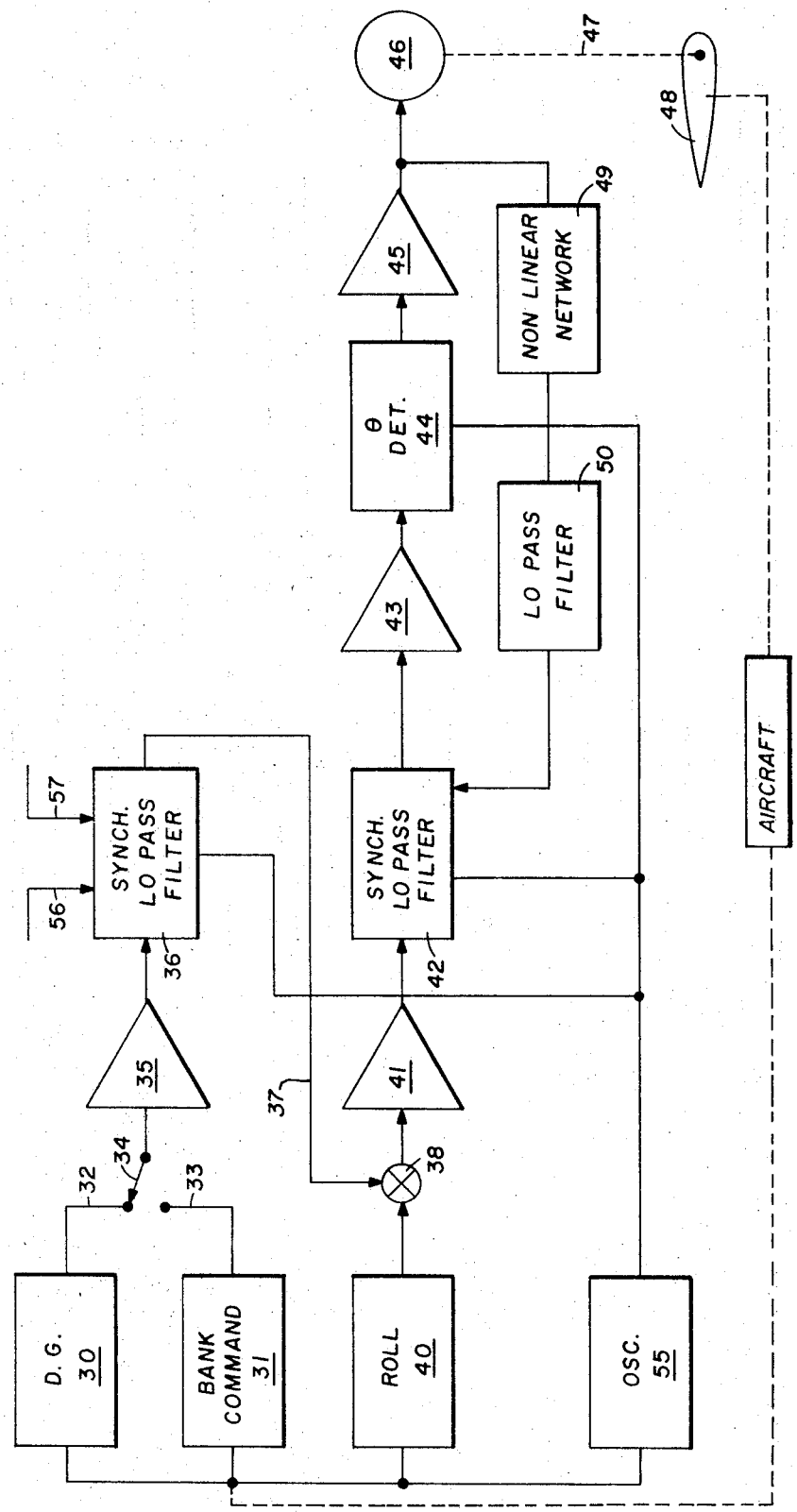
Figure 4:
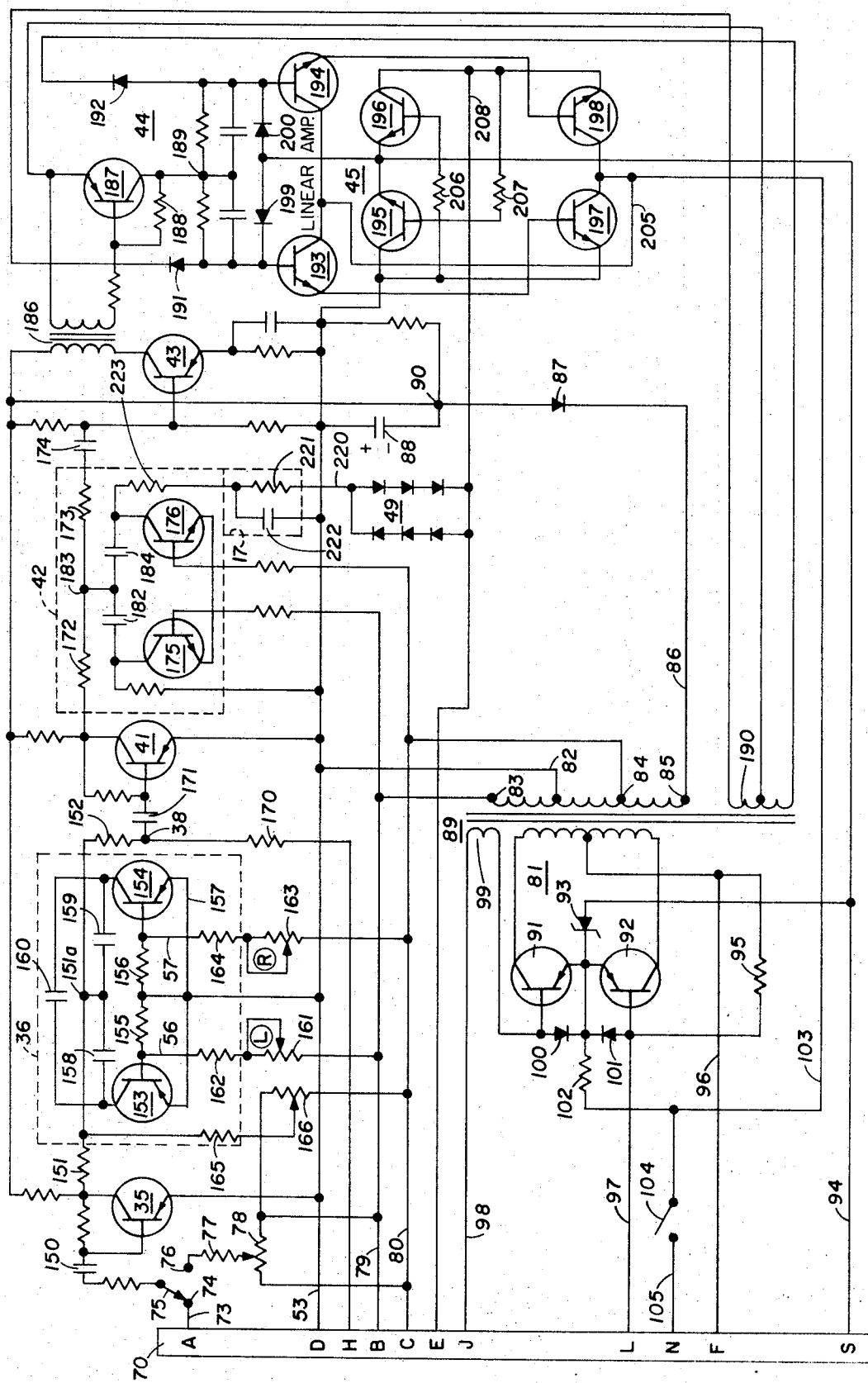
Figure 5:
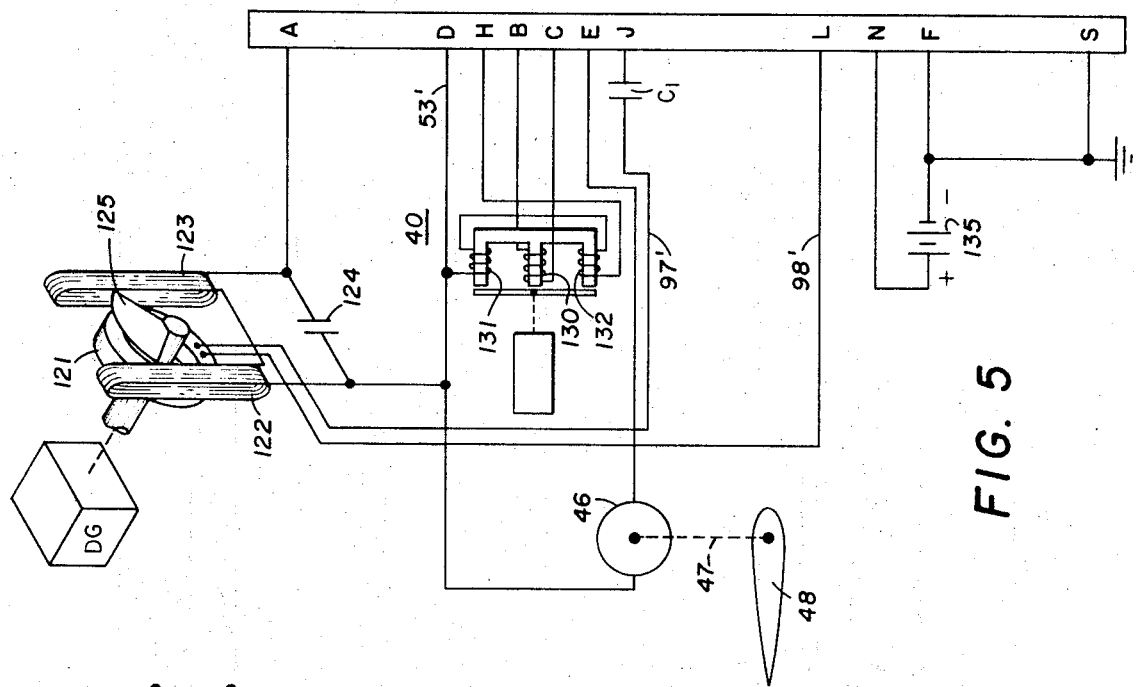
Figure 6:
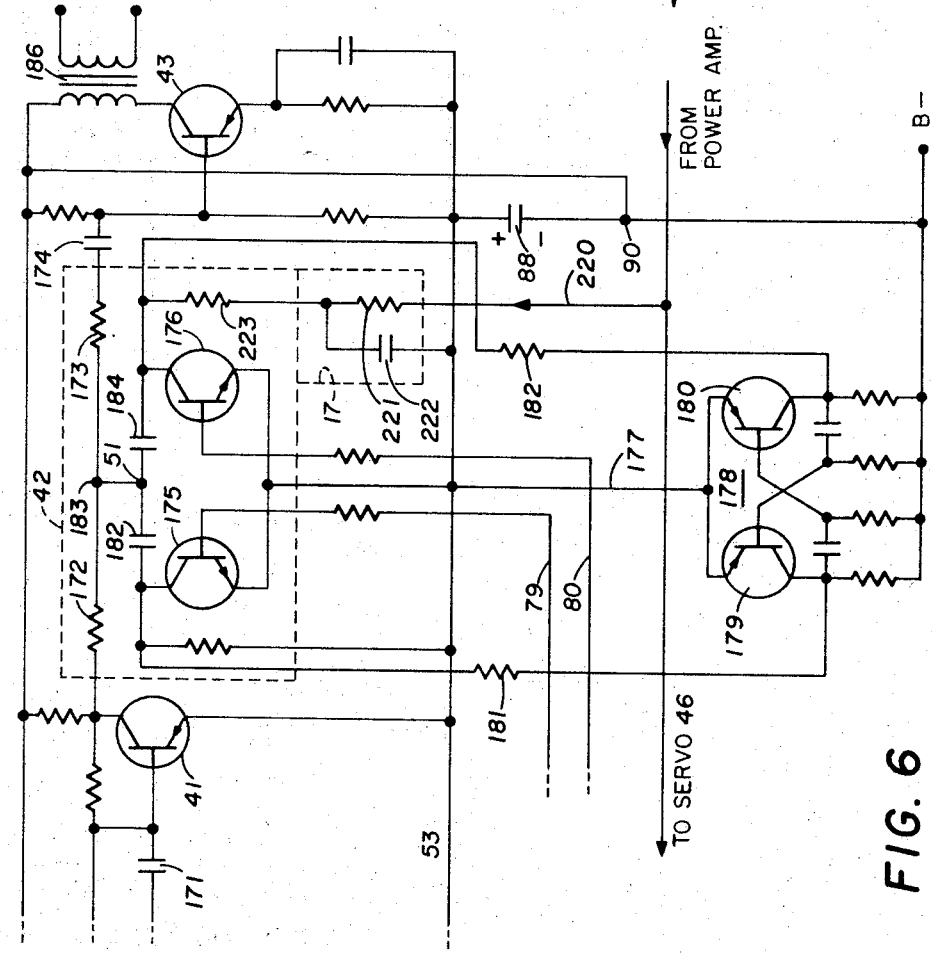

For a more complete understanding of the present invention and for further objects and advantages thereof, reference may now be had to the following description taken in conjunction with the accompanying drawings in which:

FIG. 1 is a simplified block diagram illustrating the present invention;
FIG. 2 graphically portrays signal and position functions produced in the system of FIG. 1;
FIG. 3 is a further development of the system shown in FIG. 1 to include synchronous low-pass filters;
FIG. 4 is a circuit diagram embodying the invention;
FIG. 5 is a circuit showing the elements to be coupled to the circuit of FIG. 4; and
FIG. 6 illustrates a modification of the synchronous filter 42 of FIG. 4.

In FIG. 1, a flight control system embodying the present invention is illustrated in simplified block form wherein all control surface follow-up components are eliminated. While follow-up elements are eliminated, the function thereof is simulated by use of an amplifier channel having a saturable amplifier section and which drives the servo system. The servo system may be either an electric motor, a hydraulic valve and actuator, or a pneumatic valve and actuator, all of which are well known. The servo my be of any type in which the output velocity is proportional to an input signal and in which both the amplitude and duration of the output are functions of an input control system. In short it is an integrating servo.

In FIG. 1, a main or outer loop 10 includes an attitude sensor unit 11, an attitude command unit 12, an amplifier 13, a servo actuator 14, an aircraft control surface 15, and the aircraft dynamics designated by the reference character 16.

An inner control loop includes the amplifier 13, a nonlinear network 19, and a lag network 17. The system illustrated in FIG. 1 will be recognized as involving an open loop drive for the control surface 15. In this open loop system, the controlled element or control surface 15 is made to follow an input signal without an actual comparison between them. This is done by employing the control amplifier 13 with the lag network 17 of such character that the control amplifier serves to match the controlled element to the input signal. The matching is built into the composite of the control amplifier 13 and lag network 17. By matching the input signal to the servo actuator, the output travel of any one of several integrating-type servo actuators (electrical, pneumatic, or hydraulic) is proportional to the composite of the drive signal amplitude and the time within which the drive signal acts. In accordance with the present invention, amplifier 13 is supplied with a negative feedback signal which is acted upon by the lag network 17 which has a long time constant.

The curves illustrated in FIG. 2 will assist in understanding the operation of the system of FIG. 1. Curve A represents an error signal which would be generated in a guidance system when the aircraft is abruptly displaced at time=0 from the commanded attitude. Curve A illustrates the change in the error signal as the system functions to return the aircraft back to the commanded attitude.

Curve B represents the output voltage from the amplifier 13 which is applied to the servo 14 of FIG. 1 in response to the error signal illustrated by curve A. It will be noted that in the initial region 20 of curve B, the amplifier 13 is saturated. The output, represented by curve B, falls from the saturated level 20 through the portion 21 to zero, and then reverses polarity in the portion 22.

Curve C is the internal amplifier feedback signal or the amplifier output, as modified by lag network 17. As the signal represented by curve C builds up, increasing in a negative sense, it is subtracted at the input to amplifier 13 from the signal represented by curve A to provide the amplifier drive. From the time curve B leaves plateau 20, amplifier 13 is not saturated and the output thereof is proportional to the error signal, i.e.: curve A minus the feedback signal curve C. The output during this time is proportional to an amplification factor multiplied by the difference between the error signal and the feedback signal. This may be expressed as $B=K(A-C)$. As the signal of curve A diminishes to zero, so does the feedback signal of curve C. For signals represented by curves A, B and C, the servo travel is represented by curve D. It will be noted that curve D is similar in shape to curve C and may be made close enough by suitable control of the amplifier characteristics so that it will produce the desired stabilizing inner loop effect even though the control system is in the form of an open loop.

As will hereinafter be explained, because of friction in the servo actuator, open loop operation may be subject to long period, low signal drift which is not tolerable. In avoidance of this problem, means are provided for control of the servo actuator so that static friction is overcome or compensated for.

One method of treating the problem of static friction is to apply a continuous low frequency oscillatory excitation signal to the servo actuator so that the actuator is maintained in continuous oscillatory movement. Under such conditions, low level signals will be effective to actuate the servo actuator. Preferably, in the present system, the signal developed in simulation of follow-up is so generated as to have a dead zone which is equal to or slightly greater than the dead zone represented by static friction in the servo actuator. In this case, a feedback signal will be applied to the lag network 17 through the nonlinear network 19 only when the servo 14 moves.

FIGS. 3 and 4 illustrate in block form and in detail, respectively, an aircraft control system embodying the present invention and which is responsive to a directional gyro, a bank command control, and a roll attitude gyro for the control of a servo which drives the ailerons of an aircraft.

In FIG. 3, a directional gyro 30 and a bank command unit 31 are connected by way of channels 32 and 33, respectively, and a selector switch 34 to an A.C. amplifier 35 and thence to a synchronous low-pass filter 36. The output of the filter 36 is applied by way of channel 37 to a summing unit 38. A roll attitude gyro 40 is connected to the summing unit 38 so that the combined output signals from unit 38 are applied to an amplifier 41 which drives a synchronous low-pass filter 36. The output of the filter 42 is applied to an A.C. amplifier 43 which drives a phase detector 44. The output of the phase detector is applied to a power amplifier 45 which in turn drives the servo unit 46. The servo unit is coupled by linkage 47 to a control surface such as aileron 48. The output of the amplifier 45 is applied by way of a nonlinear network and a low-pass filter 50 to synchronous low-pass filter 42. A low frequency oscillator 55 is connected to units 30, 33, 36, 40, 42, and 44 for excitation and reference purposes, as will be explained hereinafter. The phase detector 44 and the power amplifier 45 are employed to produce D.C. output voltages of either polarity so that the servo 46 may be driven either of two directions.

It will be noted that the filter 36 is provided with two input excitation channels 56 and 57. The input drive voltages on channels 56 and 57 are variable, to independently adjust the maximum right bank and left bank at which the control system will fly the aircraft, as will hereinafter be explained.

The system of FIG. 3 is more completely illustrated in the detailed circuit diagram of FIGS. 4 and 5. The circuits of FIGS. 4 and 5 are coupled together by way of a terminal strip 50 which, for convenience, has terminals labeled alphabetically.

Terminal D in each case is connected to the common bus 53. Terminal A supplies a signal from directional gyro 30 by way of line 73 leading to switch terminal 74 of switch 75. Switch 75 serves to connect the amplifier input channel either to terminal 74 or to terminal 76, which is connected by way of resistors 77 to a potentiometer 78. The potentiometer 78 is the manually controlled element of the bank control unit 31 of FIG. 3. The potentiometer 78 is connected between conductors 79 and 80 which in turn are connected to output transformer 89 of an oscillator 81. A secondary center tap 82 on the transformer 89 is connected to the common bus 53. Upper terminal 83 is connected to conductor 79 and lower terminal 84 is connected to conductor 80. Bottom terminal 85 of transformer 89 is connected by way of conductor 86 to a diode 87 to develop a D.C. voltage across condenser 88. Terminal 90 thus serves as the B— terminal of the power supply and the common bus 53 serves as the B+ terminal.

The oscillator 81 includes a pair of PNP transistors 91 and 92 having a common emitter circuit which is connected by way of a Zener diode 93 to a ground bus 94 which leads from terminal S on the strip 70. The collector of transistor 91 is connected to one extremity of the primary winding of transformer 89 and the collector of transistor 92 is connected to the other extremity. The center tap of the primary winding of transformer 89 is connected by way of resistor 95 to the base of transistor 92, and, by way of conductor 96, to terminal F on strip 70. Terminal F is connected to the ground terminal S in FIG. 5. The ground circuit is completed only in FIG. 5 in order to provide protection for the transistors in oscillator 81. The base of transistor 92 is connected by way of conductor 97 to terminal L. Terminal J is connected by way of conductor 98 and a third winding 99 to the base of the transistor 91. Oppositely poled diodes 100 and 101 serve to connect the bases of transistors 91 and 92 to the common emitter terminal. Resistor 102 connects the common emitter terminal to switch 104 which is connected by way of line 105 to the positive D.C. source input terminal N. The negative source terminal is connected to the ground bus 94 in FIG. 5.

The terminal board 71 mates with the terminal board 70. The directional gyro 30 has a coil assembly, the primary winding 121 of which is excited by way of conductors 97' and 98' leading from the oscillator 81 through capacitor $C_1$. Secondary coils 122 and 123, coupled to primary 121 by a magnetic vane 125, are connected in series opposition, with one terminal being connected to the common bus 53 and the other terminal being connected to the terminal A. A condenser 124 is across windings 122 and 123.

The roll gyro unit 40 is provided with an E-pickoff, with excitation coil 130 being connected by way of terminals B and C from the secondary winding of transformer 89 as applied to conductors 79 and 80. Coils 131 and 132 are connected in series opposition, with one terminal of the series circuit being connected to the common conductor 53' and the other terminal being connected to the terminal H.

The voltage applied to the servo actuator 46 is the voltage between terminals E and D. A D.C. source such as battery 135 is connected between terminals N and F.

The signal channel, FIG. 4, leading from the directional gyro 30 by way of switch 75, includes the amplifier 35 which is a single stage transistor amplifier. The signal is applied to the base of the transistor by way of condenser 150.

The output of amplifier 35 is applied by way of synchronous filter 36 to the summation point 38 by way of resistors 151 and 152. The synchronous filter 36 includes transistors 153 and 154, the bases of which are connected together by way of resistors 155 and 156. Operation is such that the filter becomes saturated when there is about a 20° error in the heading as sensed by the directional gyro 30. The emitters are connected together and to common bus 53 by way of line 157. The collectors are connected together by way of condensers 158 and 159, the common juncture between condensers 158 and 159 being connected to the juncture between resistors 151 and 152. A condenser 160 is connected directly across the collectors of transistors 153 and 154.

A square wave A.C. voltage from transformer 89, appearing on conductors 79 and 80, is applied to the synchronous filter 36. More particularly, the conductor 79 is connected to the base of transistor 153 by way of potentiometer 151 and resistor 162. The line 80 is connected to the base of transistor 154 by way of potentiometer 163 and resistor 164. A resistor 165 is connected to the arm of a potentiometer 166, one extremity of which is connected to conductor 80 and the other terminal of which is connected to conductor 79.

The synchronous filter 36 is used as a voltage limiter, such that "in" or "out" of phase signals may be limited independently at different amplitude levels. In the lateral guidance autopilot shown, this action is used for separate left and right bank adjustments. It will be understood, however, that because of its character as a limiter, such a synchronous filter is suited to many applications.

As shown in FIG. 4, limiting action occurs when, in the "off" condition, a transistor collector voltage tends to exceed the reverse voltage applied to its base. While PNP transistors have been shown, NPN transistors will behave the same way when all voltage polarities are reversed.

If the signal on the base of transistor 153 is negative during the "off" half cycle, the transistor 153 will not conduct in response to a signal at terminal 151a. If the signal is positive, conduction will occur when the collector becomes more positive than the base. The collector-base junction and emitter-base junction of the transistor 153 may be viewed as separate diodes.

The synchronous filter 36 employs drive voltages to transistors 153 and 154 which may be adjusted independently. When the signal is positive, transistor 153 or transistor 154 will limit when the input is of "0°" phase, while the other transistor will limit when the signal is of "180°" phase. During the half cycle when the input is positive, transistor 153 is non-conducting and transistor 154 is conducting. The reverse voltage at the collector of transistor 153 is the sum of voltages stored in the two capacitors 158 and 159. This voltage is the average of usable signal voltage during the half cycle, as would be noted by traversing the closed loop consisting of transistors 153 and 154 and capacitors 158 and 159. When this voltage is greater than the drive voltage which is applied to the base of transistor 153, transistor 153 conducts and the combined voltages on the capacitors 158 and 159 are thus limited. The level at which limiting occurs can be adjusted by varying potentiometers 161 and 163. Should the phase of the input signal relative to that of switch excitation be reversed, transistor 154 will become the limiter.

Thus, the adjustable potentiometers 161 and 163 permit compensation for imperfections in sensing the horizon. In other words, after testing of the system after installation in an aircraft, if there are found to be inaccuracies in the sensors of the system, potentiometers 161 or 163 may be adjusted to eliminate such inaccuracies. Adjustment of the potentiometers 161 and 163 also may provide adjustment of the limiting function provided by the filter 36. The potentiometer 166 provides for compensation for centering error. The time constant of the circuit of condenser 160 is about three seconds. In contrast, the time constant of the circuit involving condensers 158 and 159 is much smaller, the ratio between the time constants being about 1 to 5,000. Small capacitors 158 and 159 couple the signal into the circuit. The resultant D.C. voltage from the square wave input signal will appear between the collector terminals of transistors 153 and 154. The large condenser 160 prevents rapid response of the circuit to changes in the input signal. The filter circuit 36 thus serves to limit the output signal as to prevent an excessive maneuver of the aircraft. Further, it introduces a lag or delay in the system response. Finally, it serves to eliminate from the signal any unwanted components that may have been picked up in the various signal channels leading to the input of the filter. The filter thus permits the summation of the A.C. signals without difficulties generally attendant such procedures where unwanted components may render the system inoperative.

The excitation current for the directional gyro 30 is derived from oscillator winding 99. The winding 121 on the directional gyro, together with condenser $C_1$ and coil 89, forms a low impedance series resonant circuit of high Q. Thus, the current in the excitation winding 121 is in phase with the square wave voltage in the winding 99. The directional gyro pick-up coupling essentially is an air coupling so that the voltages in the pick-up coils 122 and 123 are in phase with the square wave voltage from the secondary winding of the output transformer 81. Since the voltages are in phase, the applicatiton of such voltages to the filter 36, as at point 151a and by way of conductors 56 and 57, permits the synchronous filter operation to be carried out. With such a filter, it has been found that mixing of A.C. signals, followed by synchronous filtering, greatly enhances the system operation, eliminating unwanted components from the signal channel. It permits mixing of A.C. amplitude-dependent signals not heretofore attempted in control systems of the present type.

Thus, an attitude command signal is applied to the summation point 38 by way of resistor 152. A bank-angle signal is applied to the summation point from terminal H by way of resistor 170. The resultant summation signal is then applied by way of coupling condenser 171 to the amplifier 41. The output of amplifier 41 is applied to a second synchronous filter 42 which includes resistor 172, leading from the collector of the transistor in amplifier 41, and resistor 173 which is connected by way of condenser 174 to the base of the transistor in amplifier 43.

The synchronous filter 42 includes transistors 175 and 176. The bases of the transistors are driven from transformer 89 by way of the buses 79 and 80. The common emitter circuit of transistors 175 and 176 is connected to the common bus 53 by way of conductor 177. Capacitor 182 connects the collector of transistor 175 to terminal 183 at the juncture between resistors 172 and 173. Similarly, a condenser 184 connects the collector of transistor 176 to terminal 183. The input coupling to filter 42 provides rapid response rather than a delay as built into filter 36 by condenser 160.

The signal from the amplifier 43 is applied by way of transformer 186 to transistor 187. The transformer 186 provides for D.C. isolation of the phase detector 44. The amplifier 43 provides an increase both in gain and power of the signal which drives the phase detector. A resistor 188 provides a forward bias on transistor 187 so that the transistor 187 will conduct when there is no signal present.

The phase detector 44 thus provides the input error signal which is applied to the terminal 189. Reference signals, derived from the winding 190 on transformer 189, are applied to the phase detector by way of diodes 191 and 192. The reference signals are applied to the bases of transistors 193 and 194 which are the driver transistors for the power amplifier 45.

Power amplifier 45 includes transistors 195, 196, 197, and 198. The common emitter terminal on transistors 195 and 196 is connected to the ground bus 94 and to the common juncture between diodes 199 and 200 which lead to the bases of transistors 193 and 194, respectively. The common collector terminal of transistors 193 and 194 is connected by way of conductor 205 to the common collector terminal of transistors 197 and 198, and, by way of conductor 103, to the positive terminal of battery 135, FIG. 5. The emitter of transistor 193 is connected to the base of transistor 197 and the emitter of transistor 194 is connected to the baes of transistor 198. The base of transistor 195 is connected to the base of transistor 196 by way of resistor 206 and, by way of resistor 207, to the emitter of transistor 198. The emitter of transistor 198 is connected by way of conductor 208 to terminal E of strip 70 which leads to the servo 46, FIG. 5. By this means, the amplifier output signal appearing on conductor 208 is applied to the servo 46. The amplifier 45 and driver amplifiers 193 and 194 are linear up to a given level above which they become saturated.

In accordance with the present invention, a feedback signal is applied by way of conductor 220, non-linear network 49, and filter 17 comprising resistor 221, condenser 222, and resistor 223, to the collector of transistor 176 in synchronous filter 42. The non-linear network comprised of one or more pairs of oppositely poled diodes serves to compensate for the voltage necessary to overcome static friction in the servo actuator 46. Thus, there will be no voltage in the feedback circuit until the output signal applied to the actuator 46 is of a level equal to the motor threshold voltage. By this means, the voltage applied to the feedback network is, proportional to, or representative of, motor speed. In the system described, the non-linear network 49 includes six diodes, three connected effectively in series in each direction. The feedback loop encompasses the saturable amplifiers 193, 194 and 45. No feedback signal is introduced into the synchronous filter 42 until the power amplifier output voltage is adequate to begin to move actuator 46. By use of a time delay feedback network around the saturable amplifiers, the transfer characteristic of the system is altered so that the servo unit will be actuated properly to control the attitude of the aircraft.

The time constant of the feedback filter 17 is controlled as to form a lag network, which, with network 49, matches the signal in the drive amplifier to the servo 46. The characteristics of the unbalance signal are thus matched to the servo so that movement of the control surface 48 will be properly controlled without the necessity of a follow-up element coupled thereto.

In one embodiment of the invention, the square wave generator 81 had an output at 5,000 cycles per second. The voltage induced into windings 122 and 123 are equal when the coupling thereto controlled by the position of rotor 120 is symmetrical so that there is zero output. Any unbalance produces an error signal which appears at terminal A for application to the amplifier 35 as a sinusoidal voltage.

In operation of the system shown in FIGS. 3 and 4, the oscillator 81 applies a square wave voltage to the synchronous filter 36 via potentiometers 161 and 163. The square wave voltage is also applied from the oscillator 81 to the DG 30, bank command 31 and roll circuit 40. The input signal from the selected one of the DG 30 or bank command circuit 31 is applied through the switch arm 75 to the input of the synchronous filter 36. During one-half cycle of the square wave voltage applied from the oscillator 81, the net effect of the input alternating current signal into the synchronous filter will be averaged and stored on capacitor 158. During the other half of the square wave reference voltage cycle from the oscillator 81, the net effect of the alternating current input signal is averaged and stored on capacitor 159. A modulated square wave output voltage is thus produced at the output of the filter 36 and applied to a summing point 38.

The filter 36 serves to eliminate unwanted signal or noise components in the input signal, and the in or out of phase (0° or 180°) components of the input signal from the DG 30 or the bank command 31 are translated into a sharp square wave output signal which is synchronized with the output of the oscillator 81. The capacitor 160 serves to provide a delay and prevent a rapid response of the circuit to large changes in the alternating current signal to the filter 36. In operation of the filter 36, the transistors 153 and 154 act as open switches when their respective bases are more positive than their collectors, and as closed switches regardless of collector polarity when adequate negative drive is applied to the base of the transistors.

The output from the synchonous filter 36 is summed at point 38 with the A.C. output of the roll circuit 40. The summed signals from point 38 are fed by way of amplifying transistor 41 to the input of a second synchronous filter 42. The input coupling of the filter 42 provides rapid response rather than the delay which is built into filter 36 by the condenser 160. Filter 42 filters out unwanted components from the summed signal. Filter 37 also provides chopping of a feedback signal from the feedback loop which is applied to the collector of the transistor 176. Filter 42 also serves to match the summed input signals to the characteristics of the servo actuator 17.

The square wave output signal from the synchronous filter 42 is applied through an amplifier 43 and applied by way of transformer 186 to the synchronous detector 44. Detector 44 provides a D.C. output signal having an amplitude and polarity responsive to the A.C. input signals. The D.C. output signal from the detector 44 is amplified by the amplifier 45 to drive the servo actuator 46. The square wave voltage derived from the oscillator 81 is applied to the phase detector by way of diodes 191 and 192. The phase detector 44 compares the input of alternating currents against the reference signals and generates an input error signal which is applied to amplifier 45. An amplifier comprising driver transistors 193 and 194 drives a power amplifier comprising transistors 195, 196, 197, and 198. The amplifier operates upon the error signals provided by the phase detector 44 and generates a feedback output. The feedback output is applied through the nonlinear network 49 and through a filter comprising resistor 221 and capacitor 222. This feedback circuit is applied to the collector of the transistor 178 for summation with the signal stored on capacitor 184. The output from the amplifier 45 is also utilized to drive the servo actuator 46. No feedback signal is introduced into the synchronous filter 42 until the amplifier 45 output voltage is adquate to begin to move the actuator 46. The servo actuator 46 operates to run at full speed until the feedback loop supplies a cancellation signal to the filter 42. Below the signal level at which the amplifier 45 is saturated, the servo actuator 46 will be run at a variable speed. As prevously described, the feedback loop serves to eliminate the requirement of a follow-up system.

As earlier mentioned, the problem present by reason of static friction in the servo actuator 46 can be treated in ways other than by the non-linear network 49. More particularly, in FIG. 6 a signal from a dither oscillator 178 is employed to effectively keep the actuator 46 constantly moving, thereby avoiding static friction.

As shown ni FIG. 6, the dither oscillator 178 has been added to the circuit. The non-lenear network 49 of FIG. 4 has been eliminated. The dither oscillator includes transistors 179 and 180. The common collector terminal is connected to the common bus 53. The collector terminal of transistor 179 is connected to the collector terminal of filter transistor 175 by way of resistor 181. The collector transistor 180 is connected to the collector transistor 176 by way of resistor 182. The circuit of FIG. 6 will be ognized as including only a portion of the circuit of FIG. 4 and, more particularly, the circuit involving the synchronous filter 42, to illustrate the manner in which the dither oscillator signal is introduced into the filter 42.

It will be recognized that the system of FIGS. 4 and 5 will be preferred over the system of FIG. 6 since the latter requires the servo actuator to be continuously energized and thus involves expenditure of energy not required in the system of FIGS. 4 and 5. It also avoids undesired overheating of the actuator but nevertheless has been found to operate satisfactorily.

While the system has been described in connection with lateral guidance, it will be recognized that it may be employed for pitch axis control.

A pitch axis control system which employs this invention is described and claimed in applicant's copending application Ser. No. 533,701, filed Mar. 11, 1966, now U.S. Pat. No. 3,470,430.

In an embodiment of the present invention as shown in FIGS. 4 and 5, the following parameters were employed:

| | |
|---|---|
| Oscillator 81 | 5000 c.p.s. |
| Transistors: | |
| 153, 154, 187 | MA 900. |
| 175, 176, 193, 194 | 2N 3116. |
| 91, 92 | 2N 1194. |
| 195–198 | 2N 3005. |
| 35, 41, 43 | MPS 6515. |
| Resistors: | |
| 155, 156 | 2.7K. |
| 151, 162, 164 | 4.7K. |
| 161, 163, 166 | 20K. |
| 165 | 150K. |
| 152 | 10K, 12K, 15K, 18K or 20K (depending upon bank range desired). |
| Condensers: | |
| 158, 159 | 1 microfarad. |
| 222 | 500 microfarads. |
| 160 | 50 microfarads. |
| Resistors: | |
| 170 | 10K. |
| 223 | 3.3K. |
| 221 | 4.7K. |
| Diodes 49 | IN4001. |

Having described the invention in connection with certain specific embodiments thereof, it is to be understood that further modifications may now suggest themselves to those skilled in the art and it is intended to cover such modifications as fall within the scope of the appended claims.

What is claimed is:

1. A flight control system for an aircraft having a control surface movable with respect to said aircraft to cause movement thereof about a predetermined axis which comprises:
   (a) a control device for generating a control signal directly proportional to rotation of said aircraft about said axis,
   (b) a servo motor unit for actuating said control surface,
   (c) an amplifier channel including an amplifier unit interconnecting said control device and said servo unit and including a feedback loop having a low pass filter therein for producing a time varying gain which matches a servo unit driving signal to the speed-versus-input signal characteristic of said servo unit to produce displacement of said control surface proportional to said control signal, and
   (d) means in said feedback loop for preventing any variation in said time varying gain except when said servo unit is in motion.

2. The combination set forth in claim 1 in which a non-linear network is included in said feedback path around said amplifier unit so that amplifier signal modification begins when said servo unit begins to move.

3. A flight control system for an aircraft having a control surface movable with respect to said aircraft to cause movement thereof about a predetermined axis which comprises:
   (a) a control device directly responsive to displacement of said aircraft about said axis to produce a control signal,
   (b) a servo drive unit for actuating said control surface, and
   (c) an amplifier channel including an amplifier unit in circuit between said control device and said servo unit and including a delaying feedback loop having a low pass filter therein for adding a low pass filtered representation of the amplifier output signal to said control signal for producing a time varying gain to generate a servo driving signal which matches the speed-versus-input characteristic of said servo unit whereby displacement of said control surface is proportional to said control signal.

4. The combination set forth in claim 3 in which a non-linear dead zone network is included in said loop ahead of delay elements therein.

5. In a flight control system for an aircraft having drive means to move a control surface with respect to said aircraft to cause movement thereof about a predetermined axis, the combination which comprises:
   (a) a control device responsive to changes in bank angle of said aircraft to produce a control signal,
   (b) a synchronous filter, a phase detector and a saturable power amplifier connected in series between said control device and said drive means to detect and amplify said control signal and to produce an output signal for excitation of said drive means, and
   (c) a low pass filter network for feeding a voltage derived from said output signal into said synchronous filter for addition to said control signal with a predetermined delay to match said output signal to the drive characteristics of said control surface.

6. The combination set forth in claim 5 in which a dead zone network is connected in series with said lag network and having a voltage drop thereacross which is at least equal to the voltage necessary to overcome static friction in said drive means.

7. A flight control system for an aircraft having a control surface movable with respect to said aircraft to cause movement thereof about a predetermined axis and having a normally balanced summing network which comprises:
   (a) a control device directly responsive to a change in attitude of said craft relative to said axis to produce an attitude change signal which is applied to said normally balanced summing network to produce an error signal therefrom,
   (b) a proportional servo amplifier connected to said network to amplify said error signal,
   (c) an integrating servo actuator excited by the output of said servo amplifier and operationally connected to said control surface, and
   (d) a feedback network having low pass filter structure for receiving a voltage proportional to the speed of said servo actuator for transmission through said low pass filter back to said summing network.

8. A flight control system for an aircraft having drive means to move a control surface with respect to said aircraft to cause movement thereof about a predetermined axis which comprises:
   (a) a first control device responsive to changes in heading to produce a first control signal,
   (b) a second control device responsive to changes in bank angle of said aircraft to produce a second control signal,
   (c) a synchronous filter for independently limiting in-phase and out-of-phase components of said second control signal,
   (d) an adding network for combining said second control signal with the limited first control signal,
   (e) a second synchronous filter and phase detector connected in series and connected to receive a signal from said adding network, (f) a saturable drive amplifier responsive to the output of said phase detector for producing an output signal for excitation of said drive means, and (g) a lag network for feeding a voltage derived from said output signal into said second synchronous filter for combining with the output from said adding network with a predetermined delay to match said output signal to the drive characteristics of said control surface.

9. In an autopilot system where ailerons are controlled by selective energization of a servo actuator, the combination which comprises:

(a) means for generating a first set of alternating current signals representative of movement of said aircraft about the roll axis, (b) means for generating a second set of alternating current signals representative of movements of the aircraft about the vertical axis thereof, (c) means for adding said second set of signals to said first set of signals for producing a summation signal wherein means are provided for delaying said second set of signals, (d) means for synchronously filtering said summation signal, and (e) means including a synchronous detector for coupling the synchronous filtering means to said actuator for correcting the attitude of said aircraft in response to movements about the two axes.

10. The combination set forth in claim 7 in which means are provided for supplying a manually developed command signal to said network.

11. The combination set forth in claim 7 wherein means are provided for generating and applying a second attitude change signal to said network.

12. The combination set forth in claim 11 wherein said attitude change signals are produced by directional and roll gyros, respectively.

13. The combination set forth in claim 7 and further comprising:

a nonlinear network in series with said feedback network.

14. In a flight control system for an aircraft having drive means to move a control surface with respect to said aircraft to cause movement thereof about a predetermined axis, the combination which comprises:

(a) a control device responsive to changes in bank angle of said aircraft to produce a control signal, (b) a synchronous filter, a phase detector and a saturable power amplifier connected in series between said control device and said drive means to detect and amplify said control signal and to produce an output signal for excitation of said drive means, (c) a lag network for feeding a voltage derived from said output signal into said synchronous filter for addition to said control signal with a predetermined delay to match said output signal to the drive characteristics of said control surface, and (d) means for adding a dither signal to said control signal to render said drive means responsive to components of said output signal derived from said control signal which are of magnitude less than that necessary to overcome static friction in said drive means.

References Cited
UNITED STATES PATENTS

| | | | |
|---|---|---|---|
| 2,531,188 | 11/1950 | Yates, Jr. | 318—20.200X |
| 2,688,112 | 8/1954 | Wimberly | 318—20.525 |
| 2,883,128 | 4/1959 | Kerpchar | 318—489X |
| 2,944,203 | 7/1960 | Anderson | 318—20.213X |
| 3,053,486 | 9/1962 | Auld Jr. | 318—489X |
| 3,137,461 | 6/1964 | Sikorra | 318—20.211X |
| 3,199,013 | 8/1965 | Bram et al. | 318—489 |
| 3,241,016 | 3/1966 | Wattson | 318—20.525 |
| 2,632,872 | 3/1953 | Warsher | 318—20.435UX |
| 2,881,379 | 4/1959 | Logan, Jr. | 318—20.515UX |
| 2,954,514 | 9/1960 | Hemstreet | 318—20.400UX |
| 3,058,700 | 10/1962 | Hecht | 318—20.441UX |
| 3,201,675 | 8/1965 | Curran et al. | 318—20.545UX |
| 3,227,935 | 1/1966 | Kawada | 318—20.400UX |
| 3,246,221 | 4/1966 | Rabier | 318—20.515UX |

THOMAS E. LYNCH, Primary Examiner

U.S. Cl. X.R.

244—77; 318—584, 611, 621, 624, 684